US009419740B2

United States Patent
Koo et al.

(10) Patent No.: US 9,419,740 B2
(45) Date of Patent: *Aug. 16, 2016

(54) ACCESS PROCEDURES FOR IN-DEVICE COEXISTENCE INTERFERENCE AVOIDANCE

(75) Inventors: Changhoi Koo, Plano, TX (US); Jun Li, Richardson, TX (US); Zhijun Cai, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1254 days.

This patent is subject to a terminal disclaimer.

(21) Appl. No.: 13/289,695

(22) Filed: Nov. 4, 2011

(65) Prior Publication Data

US 2013/0114515 A1   May 9, 2013

(51) Int. Cl.
  *H04W 4/00* (2009.01)
  *H04J 11/00* (2006.01)
  *H04W 88/06* (2009.01)
  *H04W 74/00* (2009.01)

(52) U.S. Cl.
  CPC .......... *H04J 11/0023* (2013.01); *H04W 74/004* (2013.01); *H04W 88/06* (2013.01)

(58) Field of Classification Search
  CPC .............................. H04W 74/10; H04W 88/08
  See application file for complete search history.

(56) References Cited

U.S. PATENT DOCUMENTS

| 2007/0105501 | A1 | 5/2007 | Shen et al. | |
|---|---|---|---|---|
| 2008/0232317 | A1* | 9/2008 | Jen | 370/329 |
| 2009/0156194 | A1 | 6/2009 | Meylan | |
| 2009/0279511 | A1 | 11/2009 | Zhu | |
| 2009/0291701 | A1 | 11/2009 | Zetterman et al. | |
| 2011/0194478 | A1 | 8/2011 | Lee et al. | |
| 2011/0242969 | A1 | 10/2011 | Dayal et al. | |
| 2011/0250913 | A1* | 10/2011 | Vajapeyam et al. | 455/507 |
| 2012/0040642 | A1* | 2/2012 | Zhu | H04W 72/082 455/411 |
| 2012/0040676 | A1* | 2/2012 | Jang et al. | 455/436 |
| 2012/0051297 | A1 | 3/2012 | Lee et al. | |

(Continued)

FOREIGN PATENT DOCUMENTS

| CN | 102170644 A | 8/2011 |
|---|---|---|
| KR | 20100103609 A | 9/2010 |
| WO | 2011123555 A1 | 10/2011 |

OTHER PUBLICATIONS

Koo, Changhoi, et al.; U.S. Appl. No. 13/289,697, filed Nov. 4, 2011; Title: Random Access Channel Procedures for In-Device Coexistence Interference Avoidance.

(Continued)

*Primary Examiner* — Chi H Pham
*Assistant Examiner* — Fahmida Chowdhury
(74) *Attorney, Agent, or Firm* — Conley Rose, P.C.; J. Robert Brown, Jr.

(57) ABSTRACT

A method, system and device are provided for avoiding in-device coexistence interference between different radio technologies by allocating random access channel preambles to include one or more dedicated access preambles to be sued for sending IDC interference indication messages over a random access channel (RACH) to a radio access network. In response, the radio network provides control parameters and/or instructions for avoiding interference in a random access response message corresponding to the IDC interference indication message using one or more fields in the MAC subheader and payload fields of a designated IDC MAC PDU message.

26 Claims, 7 Drawing Sheets

(56) References Cited

U.S. PATENT DOCUMENTS

| | | | |
|---|---|---|---|
| 2012/0087341 A1* | 4/2012 | Jang | H04W 28/04 370/331 |
| 2012/0207040 A1* | 8/2012 | Comsa et al. | 370/252 |
| 2012/0250662 A1 | 10/2012 | Kuo | |

OTHER PUBLICATIONS

3GPP TSG-RAN-WG4 Meeting #55; "LS on In-Device Coexistence Interference"; R4-102268; Montreal, Canada; May 10-14, 2010; 1 page.
3GPP TS 36.321 V10.3.0; 3rd Generation Partnership Project; Technical Specification Group Radio Access Network; Evolved Universal Terrestrial Radio Access (E-UTRA); Medium Access Control (MAC) Protocol Specification; Release 10; Sep. 2011; 54 pages.
3GPP TS 36.331 V10.3.0; 3rd Generation Partnership Project; Technical Specification Group Radio Access Network; Evolved Universal Terrestrial Radio Access (E-UTRA); Radio Resource Control (RRC); Protocol Specification; Release 10; Sep. 2011; 296 pages.
3GPP TR 36.816 V1.0.0; 3rd Generation Partnership Project; Technical Specification Group Radio Access Networks; Evolved Universal Terrestrial Radio Access (E-UTRA); Study on Signalling and Procedure for Interference Avoidance for In-Device Coexistence; Release 10; Nov. 2010; 34 pages.
PCT International Search Report; Application No. PCT/US2012/061868; Jan. 9, 2013; 2 pages.
PCT Written Opinion of the International Searching Authority; Application No. PCT/US2012/061868; Jan. 9, 2013; 4 pages.
Office Action dated Apr. 9, 2015; U.S. Appl. No. 13/289,697, filed Nov. 4, 2011; 33 pages.
Taiwanese Office Action; Application No. 101140882; Mar. 30, 2015; 45 pages.
European Extended Search Report; Application No. 12845739.7; May 4, 2015; 8 pages.
Korean Office Action as Received in Co-pending Application No. 10-2014-7014587 on Apr. 25, 2015; 5 pages. (No English translation available).
Notice of Allowance dated Aug. 21, 2015; U.S. Appl. No. 13/289,697, filed Nov. 4, 2011; 12 pages.
Korean Notice of Allowance; Application No. 10-2014-7014587; Oct. 27, 2015; 3 pages.

* cited by examiner

ACCESS PROCEDURES FOR IN-DEVICE COEXISTENCE INTERFERENCE AVOIDANCE

BACKGROUND

1. Field

In general, communications systems and methods for operating same are disclosed. In one aspect, methods, systems and devices are disclosed for managing coexistence interference between different radio technologies.

2. Description of the Related Art

The growing market of smart connected devices requires that the same device supports multiple radio technologies on the in-device platform. However, some configurations may cause severe performance degradation due to mutual in-device coexistence (IDC) interference. For example, with devices that support both Long Term Evolution (LTE) and Industrial, Science and Medical (ISM) technologies (such as Bluetooth and/or WLAN) and/or Global Navigation Satellite System (GNSS) technologies, there are use cases for concurrent operation of these radios. Coexistence issues may arise between ISM and/or GNSS technologies and LTE deployed in adjacent bands. As shown in Table 1 below, coexistence interference may arise where ISM transmission creates interference to the LTE receiver, and may also arise where LTE transmission creates interference to the ISM receiver.

TABLE 1

Interference of the LTE and ISM components on the in-device configuration

| LTE TDD (2.3-2.4 GHz, Band 40) LTE UL (2.5-2.6 GHz, Band 7) | ISM (2.4-2.4835 GHz) | Coexistence |
|---|---|---|
| Rx | Tx | LTE: Interfered ISM: Normal |
| Tx | Rx | LTE: Normal ISM: Interfered |

Similar coexistence issues may occur with devices that include both LTE and GNSS components. As shown in Table 2 below, when LTE and GNSS components are working on the same device, there may be interference due to adjacent frequency band operation or harmonic frequencies which cannot be avoided by the allocation of a guard band at the sub-harmonic frequency.

TABLE 2

Interference of the LTE and GNSS component configuration on in-device

| LTE (777-787 MHz/746-756 MHz, Band 13) (788-798 MHz/758-768 MHz, Band 14) | GNSS (1575.42 MHz) | Coexistence |
|---|---|---|
| Tx | Rx | LTE: Normal GNSS: Interfered |

As will be appreciated, there are challenges to using current state-of-the-art filter technology to address coexistence interference since filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

Reference is now made to the following drawings, in which.

DETAILED DESCRIPTION

Figure 1:
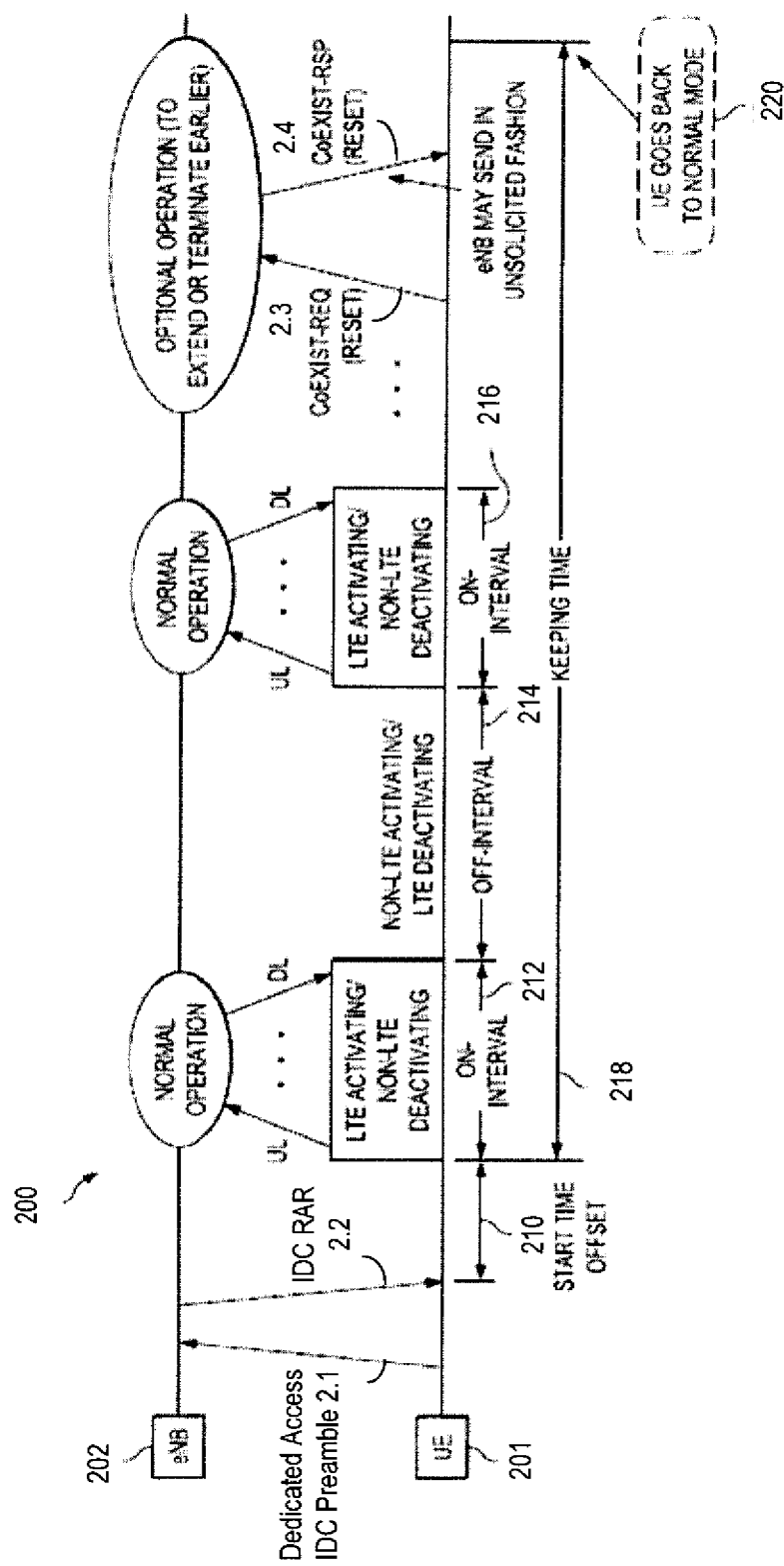
FIG. 1 is a signal flow diagram illustrating a radio resource control signaling call flow in accordance with selected embodiments.

A method, system and device are provided for providing network access using a random access channel to avoid in-device coexistence (IDC) interference between different radio technologies deployed on the same user equipment (UE) device. In selected embodiments, a method and apparatus are provided to define one or more dedicated access preambles for sending an IDC indicator over a random access channel to a network to allow quick access by the UE to address IDC situations. In response to the IDC indicator, corresponding response signaling procedures and the related information from the network are provided to convey an IDC solution (e.g. FDM, TDM etc.) to the UE in one or more random access response messages. In operation, the UE detects IDC interference between a first radio component (e.g., LTE component) and a second radio component (e.g., ISM component), such as can occur when a non-LTE component is enabled to create potential interference with reception of downlink signals by the LTE component. The UE then sends an IDC indication message to the radio network to request an interference avoidance instructions (e.g. FDM, TDM-DRX, TDM-HARQ, LTE denial, ISM denial or Power control, etc.). To expedite the interference resolution, random access and response procedures for IDC operation are provided to provide quick access and response to avoid IDC interference. To request interference avoidance instructions, the UE sends an IDC indicator by transmitting a dedicated access preamble that has been allocated to the UE for purposes of signaling the existence IDC interference. In response, the network sends a Random Access Response (RAR) message with contents providing an IDC interference avoidance to the UE. The RAR message may be sent as a designated IDC MAC PDU message using one or more fields in the MAC subheader and payload fields to specify details for a selected interference solution.

Various illustrative embodiments will now be described in detail with reference to the accompanying figures. While various details are set forth in the following description, it will be appreciated that the embodiments may be practiced without these specific details, and that numerous implementation-specific decisions may be made to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments will now be described in detail below with reference to the figures.

The difficulties associated with addressing interference caused by concurrent operation of multiple radio technologies may be understood with reference to the example of a single device which supports LTE technology with ISM technologies (e.g., Bluetooth and/or WLAN) and/or GNSS technologies which can interfere with one another, such as when the ISM transmitter interferes with the LTE receiver, or when the LTE transmitter causes interference with the ISM and GNSS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GNSS components. Currently, there is no RRM (Radio Resource Management) mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

There have been attempts to address the coexistence interference problems using existing radio resource management (RRM) mechanisms and signaling procedures, such as RSRQ (Reference Signal Received Quality) measurement, inter-frequency/inter-RAT handover, cell (re)selection, RLF (Radio Link Failure) monitoring and connection (re)establishment. However, conventional approaches have not proved capable of handling coexistence interference or providing the required quality of service (QoS). For example, a normal LTE handover procedure using RRC (Radio Resource Control) message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

For example and as disclosed at 3GPP TR36.816 v1.0.0.1: entitled "Study on signalling and procedure for interference avoidance for in-device coexistence" (Release 10), three different operation modes ("Uncoordinated," "Coordinated within UE only" and" Coordinated within UE and Network") and basic solutions (FDM and TDM) are proposed. In the "Uncoordinated" mode, different components within the same UE operate independently without any internal coordination between different components (LTE, ISM and GNSS). In the "Coordinated within UE only mode," there is an internal coordination between the different components within the same UE, which means that at least the activities of one radio is known by other component's radio, however the eNB is not aware of the coexistence issue possibly experienced by the UE and is therefore not involved in the coordination. In the "Coordinated within UE and with Network mode," different components within the UE are aware of possible coexistence problems and the UE can inform the eNB about such information and problems, so it is then mainly up to the network to decide how to avoid coexistence interference. In the disclosed solutions, there is no explanation provided of how to send an uplink IDC indicator to the eNB, but it is important for the eNB to quickly and smoothly determine and convey an interference solution so that the solution matches the detected IDC interference conditions.

To expedite access to interference solutions, the present disclosure describes dedicated access procedures that are provided to send an IDC indicator (message or Information Element) using a Dedicated IDC Access Preamble in a Random Access CHannel (RACH) which has been allocated by the eNB to provide quick access opportunities to the UE. In addition, corresponding Random Access Response signaling procedures and information are provided for conveying IDC interference solutions to the UE (e.g. FDM, TDM etc.).

To illustrate the disclosed random access procedure for IDC operation, reference is now made to FIG. 1 which depicts a radio resource control signaling call flow 200 in accordance with selected embodiments wherein LTE and non-LTE components installed on a single UE device platform exchange coexistence signaling messages to separate the LTE and non-LTE signaling in time, thereby avoiding coexistence interference. On this shared, single UE device platform, the LTE component on the UE 201 is informed of the instance when the non-LTE component is enabled, or can otherwise detect when an internal request to switch to non-LTE component is initiated. In response to an IDC interference instance, the UE 201 can request coexistence mode operation by sending an IDC indication message in a random access channel request to the eNB 202. The IDC indication message transmitted from the UE 201 can be sent over a random access channel by conveying a Dedicated Access Preamble that has been allocated as an IDC indicator (e.g., Dedicated Access IDC Preamble message 2.1) to the eNB 202 which may or may not include proposed coexistence parameters. The allocation of preambles may be implemented with RRC connection establishment message signaling from the eNB which allocates the available random access preamble signatures to include one or more dedicated IDC preambles, along with Random Access Preambles (used for contention-based random access) and Dedicated Access Preambles (used for contention-free random access). As will be appreciated, the LTE component at the UE 201 sends the request message to the eNB 202, so the LTE component must either be "on" or at least activated in an "On-interval" during coexistence mode.

The eNB 202 responds to the IDC indication message (e.g., message 2.1) by sending a response message 2.2 to specify the chosen IDC solution (e.g., FDM or TDM) In selected embodiments, the response message is provided by the eNB 202 as a random access response (RAR) message with an IDC solution (e.g., IDC RAR message 2.2) in a downlink transmission to the UE 201. In other embodiments, the response message 2.2 may include signal control parameters defining a coexistence mode of operation with a start time, end time, and alternating intervals of operation for the LTE and non-LTE components. For example, the RAR message 2.1 may specify a Start Time Offset, Keeping Time, On-interval, Off-interval, Possible Link, and Action field set to "1." The response message 2.2 may configure the coexistence parameters as absolute or delta configuration values. With an absolute value configuration, the eNB 202 sends all related coexistence parameters in the response message 2.2, whereas with a delta value configuration, the eNB 202 only sends the coexistence parameters in the response message 2.2 that are different from the request message 2.1.

Based on the coexistence parameters in the response message received by the UE 201, the LTE component may enter into a coexistence operation mode, beginning at the Start Time Offset 210 and continuing until expiration at the Keeping Time 218, with alternating On-intervals 212, 216 (during which the LTE component is enabled) and Off-intervals 214 (during which the non-LTE component is enabled).

During the coexistence mode, the LTE component at the UE 201 may optionally send an update message 2.3 to the eNB 202 to request that the duration of the coexistence operation mode be extended or terminated. In selected embodiments, the update message 2.3 is a separate message (e.g., CoExistDeact-REQ message) received at the eNB 202 which seeks to deactivate or extend the coexistence operation mode, such as by terminating or extending the Keeping Time. In other embodiments, the update message 2.3 may include update parameters, such as Start Time Offset and an Action field reset to "0," where the updated Start Time Offset value specifies the new end point or Keeping Time value for the coexistence operation mode.

The eNB 202 responds to the update message 2.3 by sending an update response message 2.4 during an available On-interval. In selected embodiments, the update response message 2.4 is a separate message (e.g., CoExistDeact-RSP message), while in other embodiments, the update response message uses the first response message (CoExist-RSP message) which has the Action field reset to "0." With the update response message 2.4, the coexistence operation mode may be deactivated or extended depending on the eNB status, such as by terminating or extending the Keeping Time. And while the update response message 2.4 is shown as being sent in response to the update message 2.3, the update response message 2.4 may be sent from the eNB 202 in an unsolicited manner without receiving an update message (i.e., the update response message 2.4 is not sent in response to a received message). For example, the update message 2.4 can be sent without solicitation if the eNB 202 determines that the coexistence operation mode requires extension or early termination. Once the Keeping Time 218 expires, the LTE component in the UE 201 and the eNB 202 may return to normal mode where the LTE component is enabled and the non-LTE component is disabled and turned-off.

Disclosed herein are expedited reporting techniques used to send IDC indicators using dedicated access procedures in random access channels in order to provide quick access opportunities to the UE for reporting IDC interference conditions. In addition, there is disclosed corresponding response signaling procedures and related information from the eNB in order to provide IDC solution (e.g. FDM, TDM etc.) to the UE.

As described herein, an expedited IDC indicator is sent over a random access channel when the UE detects interference from a non-LTE component installed in the same UE, or the UE receives an internal indication from the non-LTE component indicating when the non-LTE component will be enabled. At the eNB, the IDC indicator is processed as a request for an interference solution (e.g., FDM, TDM-DRX, TDM-HARQ, LTE denial, ISM denial or Power control, etc.) from the eNB in order to avoid IDC interference. To expedite delivery of the interference solution, the UE may use a modified random access channel procedure to provide quick access to the eNB for purposes of obtaining instructions in either the "Coordinated" or "Uncoordinated" operation modes. In selected embodiments, the UE transmits and IDC indicator (as a message or Information Element) to the eNB by using one or more Dedicated IDC Access Preambles which have been allocated by the eNB for IDC indication messages.

In support thereof, PRACH preamble boundary parameters are defined to establish Dedicated IDC Access Preambles (which are dedicated to the IDC operation), along with Random Access Preambles (used for contention-based random access) and Dedicated Access Preambles (used for contention-free random access). In selected embodiments, the Dedicated IDC Access Preambles are established at the UE using new preamble boundary parameters (e.g., numberOf-IDC-Preamble, IDC-ConfigDedicated, numberOf-Dedicated-Preambles, Ra-IDCResponseWindowSize, Max-numberofIDCRAR, Ra-IDCPreambleIndex, and Ra-IDCPRACH-MaskIndex) which are dedicated to the IDC operation and enable the UE to allocate Dedicated IDC Access Preambles that may be used by the UE to signal IDC interference to the eNB. As will be appreciated, the preamble boundary parameters can be exchanged between the network and the mobile device by defining new RRC signaling messages or new information elements which may be inserted in existing RRC messages to establish and allocate one or more Dedicated IDC Access Preambles. Thus, there is no limitation or restriction to any particular application or messaging scheme since the preamble allocation functionality of the proposed messages could be adopted as information elements (IE) in other new or existing RRC messages. The specific names used here are for illustration only, and other names may be used to achieve the described function or outcome from the processing of the message. By allocating only a portion of the Dedicated Access Preambles for use providing IDC indications, the remaining Dedicated Access Preamble can be used for contention-free random access. In this way, an appropriate access preamble may be selected and sent to the network, either by using an allocated Dedicated IDC Access Preamble which provides an IDC indication, or by using a Dedicated Access Preamble and a subsequent L2/L3 message to send the IDC indicator after receiving Random Access Response message from the eNB. In the latter case, the IDC indicator can be embedded into any RRC messages to be transmitted on the granted UL opportunity (e.g. L2/L3 message) as a type of IE or new IDC indicator RRC message can be transmitted on the granted UL opportunity (e.g. L2/L3 message). Once an IDC interference solution is selected by the eNB, the solution is conveyed to the UE in a Random Access Response message having a predetermined message format to indicate the IDC interference avoidance solution. Once the UE receives the response message at the downlink signaling channel, the received interference solution instructions will guide the operation of the UE. In some embodiments, the interference solution instructions received at the downlink signaling channel will cause the UE to move to another frequency or channel after taking any solution (FDM or TDM) on the downlink signaling channel. In other embodiments, the UE may return to the previous frequency which was interfered by the non-LTE component after taking a TDM solution on the downlink signaling channel. In still further embodiments, the UE may remain on the downlink signaling channel if the downlink signaling channel is not highly loaded.

Figure 2:
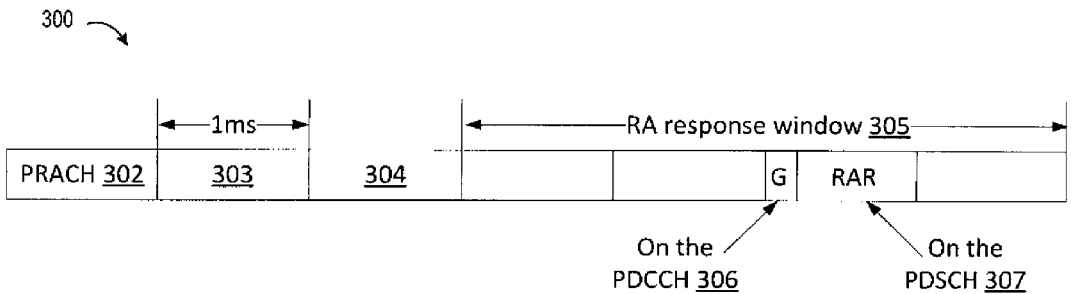
FIG. 2 illustrates an LTE random access channel signaling sequence with the relative time frames of an uplink Physical Random Access Channel (PRACH) preamble message and a corresponding downlink random access response message.

To illustrate the operation of the process for using a random access channel to convey IDC indications, reference is made to FIG. 2 which illustrates an LTE random access channel signaling sequence 300 with the relative time frames of an uplink PRACH preamble message 302 and a corresponding downlink random access response message 307. As will be appreciated by those skilled in the art, the signaling sequence relates to both contention-based and contention-free random access procedures defined in the 3GPP specification for providing connection (re)establishment, uplink timing alignment, etc. For both random access procedures, a fixed number (e.g., 64) of Random Access Preamble (RAP) signatures are available in each LTE cell for partitioning into contention-based and contention-free RACH procedures. To initiate connection over a random access channel, the UE selects and sends a Physical Random Access Channel (PRACH) signature (e.g., 302) from the available RAP signatures based on the type of random access desired. For example, when requesting contention-based random access, the UE selects one of the allocated contention-based signatures which may be subdivided into two subgroups, such as Group A for a first set of signal conditions (e.g., path loss is less then Pcmax (e.g. 5 dB) and message length is equal or less than messageSize-GroupA (up to 256 Bit)) and Group B for a second set of signal conditions (not meeting the requirements for the first set of signal conditions). On the other hand, when requesting contention-free random access, the UE selects a dedicated contention-free signature from the Dedicated Random Access Preamble(s) assigned to the specific UE(s) on a per-need basis. In response to the selected PRACH signature, the eNB generates and sends a random access response (RAR) message with a designated response window 305 that is delayed with respect to the PRACH signature 302 by a predetermined minimum delay 303 (e.g., 1 ms). As depicted, the eNB returns a downlink transmission resource allocation message "G" 306 (on the PDCCH) based on the subframe level (1 ms time slot), followed by an RAR message 307 (on PDSCH). As depicted, the UE waits 4 ms after transmitting the PRACH Preamble 302 to the eNB to receive the corresponding RAR 307.

Figure 3:
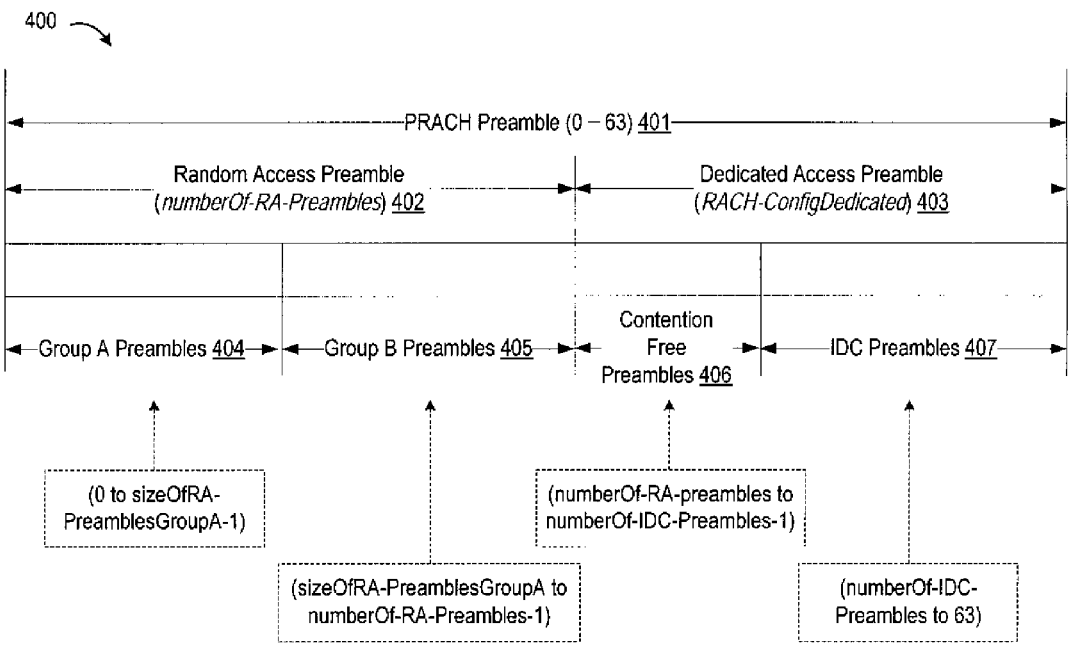
FIG. 3 illustrates an example random access preamble allocation and structure to provide random access preambles for IDC operation along with existing random access channel operations.

In order to provide random access channel signaling of IDC indications, there is disclosed herein an arrangement and methodology for allocating PRACH preambles to support contention-based and contention-free random access, along with IDC interference signaling using dedicated IDC access preambles. An example allocation is illustrated in FIG. 3 which depicts a random access preamble allocation structure 400 in which a fixed number (e.g., 64) of available PRACH preambles 401 is allocated between random access preambles 402 and dedicated access preambles 403. In keeping with existing random access procedures, the random access preambles 402 can be shared by different UEs in the cell and are used to signal contention-based random access requests. In addition, the random access preambles 402 may be divided into subgroups (e.g., groups A and B) based on signal conditions and/or message characteristics. The dedicated access preambles 403 also support existing random access procedures by providing dedicated access preambles 406 which are specifically dedicated or assigned to specific UE(s) by the eNB and are used to signal contention-free random access requests. In addition to dedicated access preambles 406, the dedicated access preambles 403 include one or more IDC preambles 407 which are dedicated for IDC indication signaling. By selecting the dedicated IDC access preamble(s) 407, the UE obtains collision-free access to the eNB for IDC indication signaling to achieve quick recovery and fast resumption.

In operation, the UE selects a preamble for a required random access procedure by processing preamble partition parameters which delineate the different preamble groups in the PRACH preambles 401. For example, a first partition parameter (e.g., Prach-ConfigIndex) may provide a single index value that defines the available set of PRACH resources for the transmission of the Random Access Preamble (e.g., with a value between 0 and 63), as well as the set of subframes in which a preamble may be sent. The set of subframes may be further restricted by a provided physical random access channel (PRACH) mask index, and/or by one or more additional grouping parameters (e.g., numberOfRA-Preambles and sizeOfRA-PreamnlesGroupA) which may be used to determine which preambles are contained in RAP group A and RAP group B. For example and as shown in FIG. 3, the preambles in RAP group A 404 are preambles 0 to sizeOfRA-PreamblesGroupA—1, while the preambles in RAP group B 405 are preambles sizeOfRA-PreamblesGroupA to numberOfRA-Preambles—1 from the set of 64 PRACH preambles 401.

In support of random access channel signaling of IDC indications, a first IDC partition parameter (e.g., IDC-ConfigDedicated) may be used to specify that there are dedicated random access parameters for IDC indication signaling. If the IDC-ConfigDedicated parameter is not signaled, the UE is able to use all dedicated access preamble 403 for contention-free random access procedures. In addition or in the alternative, a second IDC partition parameter (e.g., numberOf-Dedicated-Preambles) may be used to specify the total number of Dedicated Access Preambles for IDC indication signaling and existing contention-free random access, and a third IDC partition parameter (e.g., numberOf-IDC-Preamble) may be used to specify the number of dedicated access IDC preambles. For example and as shown in FIG. 3, the contention-free preamble group 406 available for contention-free random access procedures are preambles numberOf-RA-Preambles to numberOf-IDC-Preambles—1, while the preambles available for IDC signaling in the dedicated access IDC preamble group 407 are preambles numberOf-IDC-Preambles to 63. An additional IDC partition parameter (e.g., Ra-IDCPreambleIndex) may be used to explicitly signal the preamble index of the random access resource selection for IDC operation, while another IDC partition parameter (e.g., Ra-IDCPRACH-MaskIndex) may be used to explicitly signal the PRACH Mask Index of the random access resource selection for IDC operation.

As disclosed herein, the predetermined preamble allocation structure 400 may be permanently set as a system parameter. In addition or in the alternative, the preamble allocation structure 400 can be flexibly set by conveying one or more preamble partition parameters with one or more RRC signaling messages, MAC CE messages, or broadcast messages such as SIBs. This flexibility allows the uplink random access signaling channel to be allocated to support IDC signaling according to cell loading or frequency usage so that a random access channel can be temporarily reserved for the IDC UEs in a cell, but otherwise not reserved if there are no IDC UEs in a cell. In selected embodiments, the preamble partition parameters are sent by the eNB to one or UE's in the cell, and each UE uses its respective partition parameters to select a preamble from the pool of preambles that applies to the given situation. In this way, the eNB conveys preamble partition parameters to control the number of useful preambles in each category. In cases where there are a large number of IDC UEs (i.e., UEs equipped with non-LTE component) camped in the cell, the eNB may allocate relatively larger number of dedicated access IDC preambles for the IDC UEs to reduce the potential collision when accessing the RACH. In this case, the IDC UE selects one of the dedicated access IDC preambles 407 when it experiences IDC interference or receives a pre-indicator from non-LTE component (e.g., when the non-LTE component in the IDC UE knows the non-LTE component transmission schedule, such as receiving S-APSD from 802.11 access point). Alternatively, the UE may select one of the Random Access Preambles 402 when there is no IDC interference. With this arrangement, an eNB that receives a dedicated access IDC preamble from the IDC UE quickly recognizes that the IDC UE is in IDC interference, and can thereby provide fast reaction to resolve the IDC interference problems. In other embodiments, the eNB can allocate the dedicated access IDC preamble to the UE on a per-UE basis, in which case the IDC UE does not need to select a preamble from the dedicated access IDC preambles using boundary information, thereby further expediting the IDC indication reporting procedure. In these embodiments, an IDC UE is allocated a dedicated access IDC preamble by the eNB when the IDC UE initially accesses the cell so that the IDC UE can use its assigned dedicated access IDC preamble to signal an IDC indication. In other embodiments, the eNB allocates a dedicated access IDC preamble to a group of UEs if there are not enough available IDC preambles so that the UE may have a collision in worst case when simultaneously using the shared dedicated access IDC preamble.

As will be appreciated, preambles in the dedicated access preamble group 403 can be shared with TDC UEs without requiring that the dedicated access IDC preamble information be specified. However, since the UE randomly selects a dedicated preamble from the dedicated access preamble group 403, an IDC UE may have a conflict with another UE which is using a contention-free random access channel to perform handover or data resumption, or even with another IDC UE. To avoid such conflicts, the IDC UE may explicitly signal the purpose of transmitting the dedicated access IDC preamble to quickly resolve the IDC interference at the UE. In addition or in the alternative, conflicts can be avoided by having the eNB indicate its ability to support IDC operation during RRC connection setup, RRC Connection Reconfiguration (handover case), RRC Re-establishment and Handover to EUTRAN. In selected embodiments, the IDC indication signaling purpose may be explicitly signaled by adding the IDC indicator on the dedicated access IDC preamble. Upon receiving the dedicated access TDC preamble with IDC indicator, the eNB determines and returns an appropriate interference solution operation (e.g., TDM, FDM or any other possible solution) to resolve the IDC interference at the UE. In other embodiments, the IDC indication signaling purpose is explicitly signaled using a subsequent L2/L3 message (e.g. Msg.3) to send the IDC indicator to the eNB. For example, an IDC UE that receives a RAR (Random Access Response) may send a response L2/L3 message with an IDC indicator. When the eNB receives L2/L3 message with TDC indicator, the eNB determines and returns an appropriate interference solution operation (e.g., TDM, FDM or any other possible solution) to resolve the IDC interference at the UE. In this option, the IDC indicator can be embedded into any RRC messages to be transmitted on the granted UL opportunity (e.g. L2/L3 message) as a type of information element, or a new IDC indicating RRC message can be transmitted on the granted UL opportunity (e.g., L2/L3 message)

Figure 4:
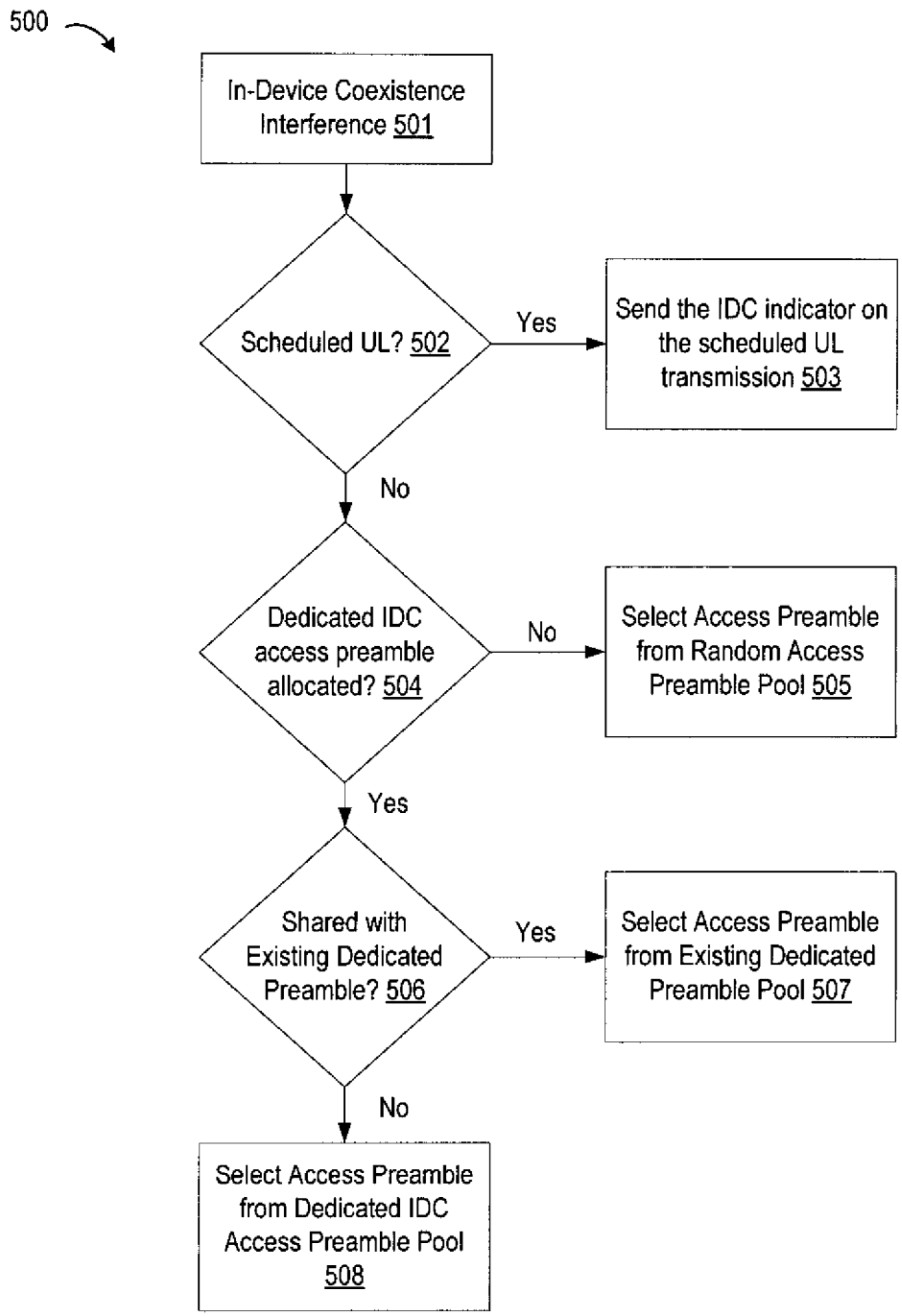
FIG. 4 illustrates a random access preamble selection procedure used to provide an IDC indication over a random access channel using an allocated random access preamble.

To illustrate selected example embodiments of the process for using the random access channel to convey UL IDC indications from the UE, reference is made to FIG. 4 which depicts a flow chart illustration 500 of a random access preamble selection procedure used to provide an IDC indication over a random access channel using an allocated random access preamble in accordance with selected embodiments. As depicted, the IDC indication reporting procedure 500 begins when the UE, which is equipped with LTE and non-LTE components in the same platform, detects the existence of in-device coexistence interference (at step 501). As indicated at step 502, the UE prepares to transmit an IDC indicator to the eNB to obtain an IDC interference avoidance solution by first determining if there is a scheduled uplink message. For example, the UE may check for an UL scheduling request, UL control signal transmission, UL data transmission, UL HARQ ACK/NACK, etc. If the UE has any scheduled UL transmission (affirmative outcome to decision 502), the UE may send the IDC indicator with UL transmission (step 503). However, if there is no scheduled UL transmission (negative outcome to decision 502), the UE determines if one or more Dedicated Access IDC Preambles have been allocated to the UE by the eNB at step 504. If not (negative outcome to decision 504), the UE selects one of the random access preambles to send the IDC indication using a contention-based random access channel (step 505). However, if the UE has an allocated Dedicated Access IDC Preamble (affirmative outcome to decision 504), the UE determines at step 506 if the allocated Dedicated Access IDC Preamble is shared with the Dedicated Access Preambles used for contention-free random access. If so (affirmative outcome to decision 506), the UE selects an access preamble from the existing shared Dedicated Access Preambles (step 507) that have been allocated by the eNB to send the IDC indication, such as by sending the selected Dedicated Access Preamble with an IDC indication in a separate L2/L3 message. However, if the Dedicated IDC Access Preamble is not shared (negative outcome to decision 506), the UE selects one of the Dedicated IDC Access Preambles to send the IDC indication (step 508).

Figure 5:
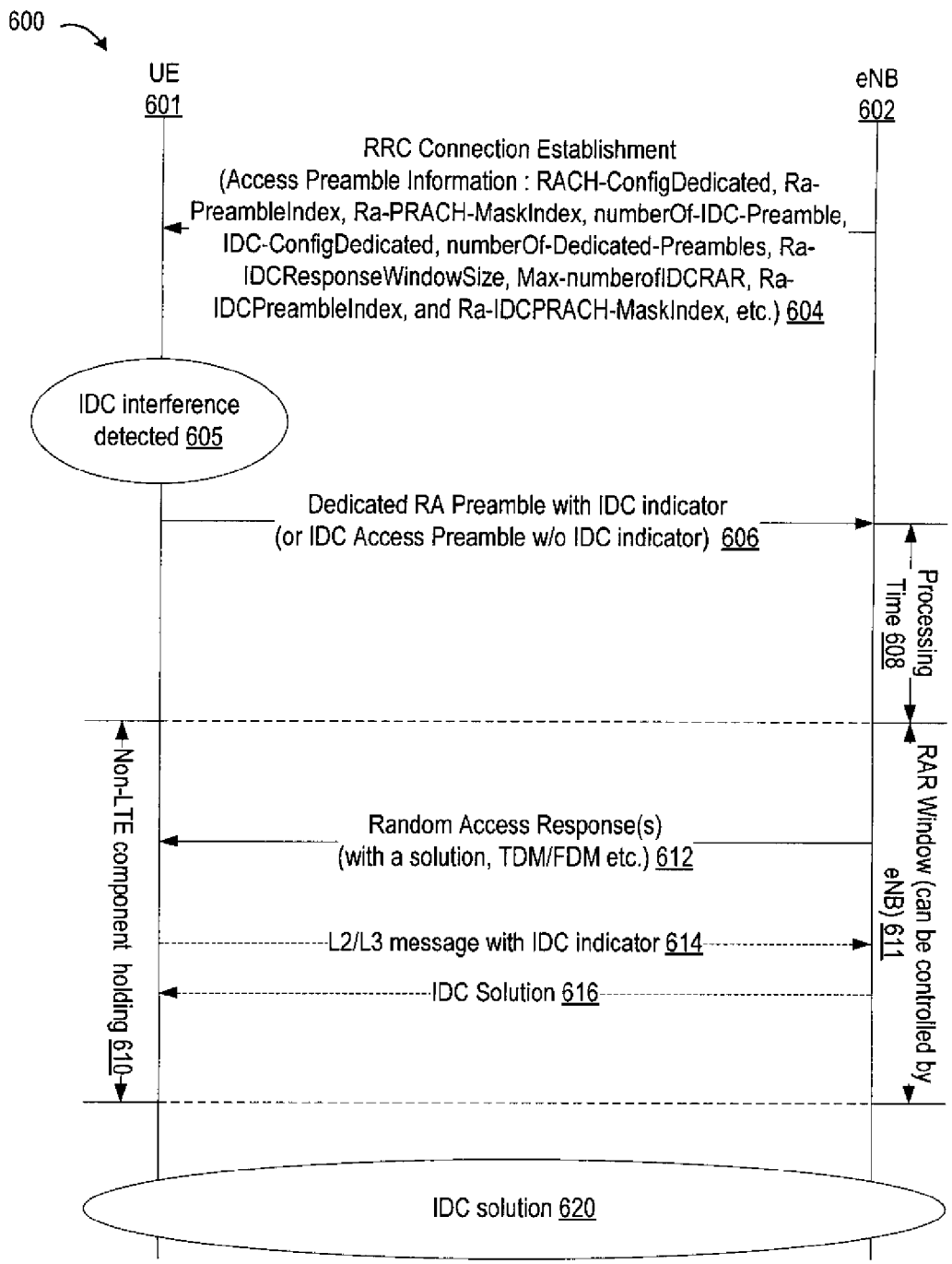
FIG. 5 is a signal call flow diagram illustrating an example access procedure for providing an IDC indication over a random access channel.

To illustrate the operation of the process for using an uplink random access channel to signal an IDC indication, reference is made to FIG. 5 which depicts the call flow diagram 600 illustrating an example access procedure for the UE 601 to provide an IDC indication to the eNB 602 over a random access channel. As depicted, the UE 601 which is equipped with LTE and non-LTE components in the same platform allocates the random access preambles to include one or more dedicated IDC preambles, along with Random Access Preambles (used for contention-based random access) and Dedicated Access Preambles (used for contention-free random access). As will be appreciated, the preamble allocation can be flexibly set with partition parameters from one or more RRC Connection Establishment messages 604 or other signaling messages or broadcast messages such as SIBs. This flexibility allows the number of dedicated access IDC preambles to be set according to cell loading or frequency usage so that a uplink random access channel can be temporarily reserved for the IDC indication signaling if there are IDC UEs in a cell, but otherwise not reserved if there are no IDC UEs in a cell.

Once in-device coexistence interference is detected (step 605) at the UE 601, an interference solution should be quickly obtained with or without cooperation with eNB 602, especially when a non-LTE component at the UE 601 interferes with downlink (DL) LTE transmissions which could include important DL signal or data transmission, resulting in signal loss or delay. To provide fast access to the eNB 602 and quick recovery for continuous operation in RRC_Connected_Mode and RRC_Idle_Mode in the event of detected IDC interference, the UE 601 sends a dedicated access preamble to the eNB 602 at step 606 to signal that there is in-device coexistence interference. In selected embodiments where a dedicated access preamble (e.g., selected from the contention-free preambles 406), an explicit IDC indicator may be included with the transmitted dedicated access preamble. However, in cases where a dedicated access IDC preamble is used, no explicit IDC indicator is required because the preamble itself already conveys the IDC indication. Thus, the IDC indicator can be a new IDC indication message or be a type of Information Element (IE) added on the existing RRC message to the eNB 602 in order for the eNB 602 to resolve the IDC interference problem. At this point, the UE 601 may also be configured to measure and report information about frequencies that are available or unavailable for use with the UE 601 so that the eNB 602 has an accurate understanding of the conditions at the UE 601 so that the eNB 602 can make more intelligent interference solution decisions.

Upon receiving the random access preamble with IDC indicator, the eNB 602 computes interference solution instructions during a processing time window 608. Subsequently, the eNB 602 sends the instructions to the UE 601 in a random access response (RAR) message 612 that is sent during an RAR window 611 which may be controlled by the eNB 602 using predefined RRC signaling, SIB or MAC CE messages to the UE 601. As described hereinbelow, the RAR message 612 can be transmitted once or multiple times, and may include the specific IDC solution (e.g. TDM, FDM, Power control and/or autonomous denial etc.) selected by the eNB 602 for the UE 601. As indicated with the holding window 610, the non-LTE component at the UE 601 should not be enabled to make UL transmissions during the RAR window 611 in order to provide interference free conditions to the LTE component at the UE 601.

During the RAR window 611, the UE 601 waits for the RAR message 612 on PDSCH that corresponds to the dedicated access preamble 606 sent by the UE 601. In addition to conveying the ID of detected preamble signature, Timing Advance instruction, initial UL grant for step 3 (L2/L3 message), C-RNTI and back off indicator, the RAR message 612 may also provide interference solution instructions in one or more designated IDC MAC RAR messages. In selected embodiments, the RAR message 612 is transmitted once during the RAR window 611, and in other embodiments, the RAR message 612 is transmitted multiple times during the RAR window 611 in order to provide reliable and robust solution signaling.

In selected embodiments where the UE 601 uses a dedicated access preamble 606 without an IDC indicator, the UE 601 may use a subsequent L2/L3 message 614 (e.g. Msg.3) to send the IDC indicator to the eNB 602. As shown in FIG. 5, the UE 601 responds to the RAR message 612 by sending the L2/L3 message 614 which includes an expicit IDC indicator. Upon receiving the L2/L3 message 614, the eNB 602 determines and returns an appropriate interference solution (e.g., TDM, FDM or any other possible solution) in an IDC solution message 616 to resolve the IDC interference at the UE 601. In this option, the IDC indicator can be embedded into any RRC messages to be transmitted on the granted UL opportunity (e.g. L2/L3 message) as a type of information element, or a new IDC indicating RRC message can be transmitted on the granted UL opportunity (e.g. L2/L3 message).

Once the UE 601 receives the IDC interference solution (in response message 612 or 616) from the eNB 602, the UE 601 may send an ACK message (not shown), and the UE 601 and eNB 602 can resume normal operation using the interference solution at step 620.

As disclosed herein, the duration of the RAR window 611 may be controlled and adjusted by the eNB 602. For example, current LTE specifications provide a 4 ms RAR window, but the window duration could be changed according to the type of non-LTE component capability and performance. For example, a beacon signal from the access point (AP) in a wireless local access network (WLAN) system and initial setup procedures in Bluetooth (BT) are important system signaling and may need variable time operation. To enable the non-LTE component to receive those important signals, the RAR window time slot length may be changed to provide time resources for reliable reception. To provide a flexible reception time for receiving the RAR message 612, an RAR reception window control parameter (e.g., Ra-IDCResponseWindowSize) is provided to control the duration of the RAR window for receiving the RAR during IDC operation. The unit value may be in subframes or actual time. An additional RAR reception window control parameter (e.g., MaxnumberofIDCRAR) may be provided to indicate that the maximum number of times that the eNB 602 will transmit an RAR message during the RAR window time 611, thereby providing flexible and robust RAR transmission to the UE 601. With multiple RAR transmissions, a UE 601 that misses a first RAR message has another chance to receive a subsequent RAR message. The disclosed RAR reception window control parameters may be conveyed by RRC signaling, SIB or MAC CE.

Figure 6:
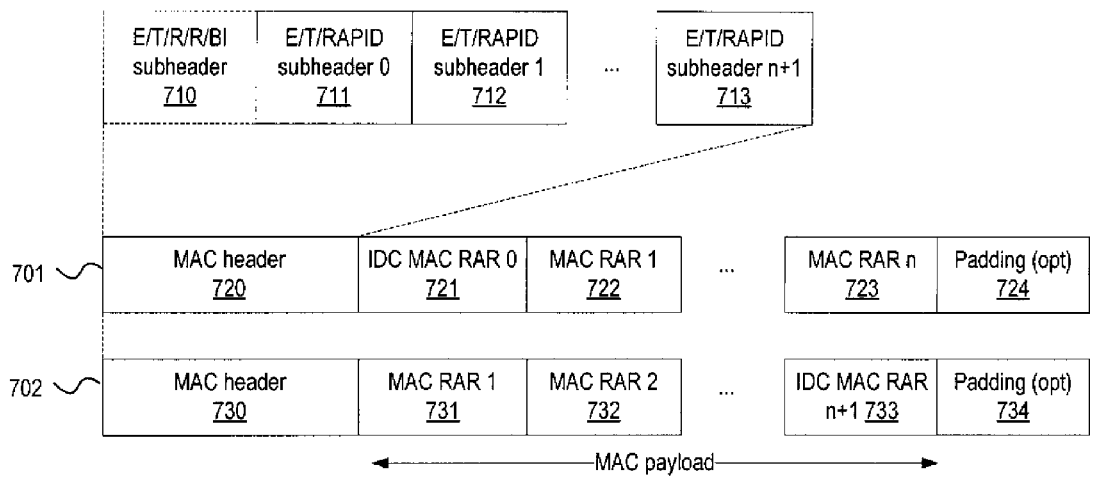
FIG. 6 illustrates a random access response MAC PDU message sent in response to a dedicated access preamble providing an IDC indication.

To convey interference solutions to the UE, the RAR message may be conveyed with one or more Medium Access Control Protocol Data Unit (MAC PDU) messages, each having a MAC header and MAC payload portion. As shown in FIG. 6, the RAR MAC PDU message (e.g., 701) sent in response to a dedicated access preamble includes a MAC PDU header (e.g., 720) having one or more MAC PDU subheaders (e.g., 710-713), including a first E/T/R/R/BI MAC subheader (e.g., 710) and one or more additional E/T/RAPID MAC subheaders 711-713 corresponding, respectively, to one or more IDC MAC RAR messages 721-723 in the MAC payload portion. In the MAC PDU subheaders 710-713, the following header field descriptions apply:

The Extension header field (E) uses a "0" to indicate that MAC RAR or padding starts at the next byte, and uses a "1" to indicate that another set of E/T/RAPID follows.

The Type header field (T) uses a "0" to indicate a backoff indicator (BI) type, and uses a "1" to indicate a RAPID type.

The Random Access Preamble ID header field (RAPID) uses a predetermined number of bits (e.g., 6 bits) to identify the random access preamble corresponding to the RAR.

The Reserved header field (R) is a reserved header field which may be used as described below to convey an IDC MAC RAR message during the RAR window.

The Backoff Indicator header field (BI) uses a predetermined number of bits (e.g., 4 bits) to convey backoff information to be used when a collision occurs, and may be used as described below to convey an IDC MAC RAR message during the RAR window.

In order to convey an IDC interference solution in the RAR message, one or more selected fields in the first E/T/R/R/BI MAC subheader 710 may be used to signal that the MAC PDU is an IDC MAC PDU having an interference solution in one of the MAC RARs. In selected embodiments, the Reserved (R) header field(s) in the first E/T/R/R/BI MAC subheader 710 may be modified to indicate that the proposed IDC MAC RAR will be transmitted during the RAR window, although the presence of two R fields in the first MAC subheader 710 allows for different modification options. In a first option, the first "R" field in the first MAC subheader (e.g., 710), if set to "1," indicates that the IDC MAC RAR is included in the payload part of MAC PDU. Otherwise, first "R" field indicates that no IDC MAC RAR (e.g., normal MAC RAR transmission) is included. In a second option, the second "R" field in the first MAC subheader 710, if set to "1," indicates that the IDC MAC RAR is included in the payload part of MAC PDU. Otherwise, second "R" field indicates that no IDC MAC RAR is included. In the third option, both the first and second "R" fields in the first MAC subheader 710 are used. In this option, the first "R" bit being set to "1" indicates that the IDC MAC RAR is included in the payload part of MAC PDU. Otherwise, no IDC MAC RAR is included. With the first "R" bit set to "1," the second "R" bit being set to "1" indicates that an FDM solution is included in IDC MAC RAR so that it can save the bit information for IDC MAC RAR usage. But with the first "R" bit set to "1" and the second "R" bit being set to "0," an indication is provided that a TDM solution is included in IDC MAC RAR so that it can save the bit information for IDC MAC RAR usage.

In other embodiments, IDC interference solutions may be conveyed in the RAR message by modifying the Backoff Indicator (BI) header field(s) in the first E/T/R/R/BI MAC subheader 710 to indicate that the proposed IDC MAC RAR will be transmitted during the RAR window. In these embodiments, the 4 bits of the BI header field can be used to convey one or more interference solutions. For example, the existing LTE standard specifies only thirteen backoff indication parameters which can be uniquely identified using only index values 0-12 from the 4-bit BI field. As a result, there are three index values (13-15) available from the 4-bit BI field that can be used for IDC operation. In an example mapping of unused index values to IDC interference solutions, a BI field having an index value 13 may be used to indicate that an FDM solution is included in the IDC MAC RAR, a BI field having an index value 14 may be used to indicate that a TDM-DRX solution is included in the IDC MAC RAR, and a BI field having an index value 15 may be used to indicate that a TDM-HARQ solution is included in the IDC MAC RAR. Of course, it will be appreciated that the specific index mapping to specific solution can be changed or modified as desired.

Figure 7:
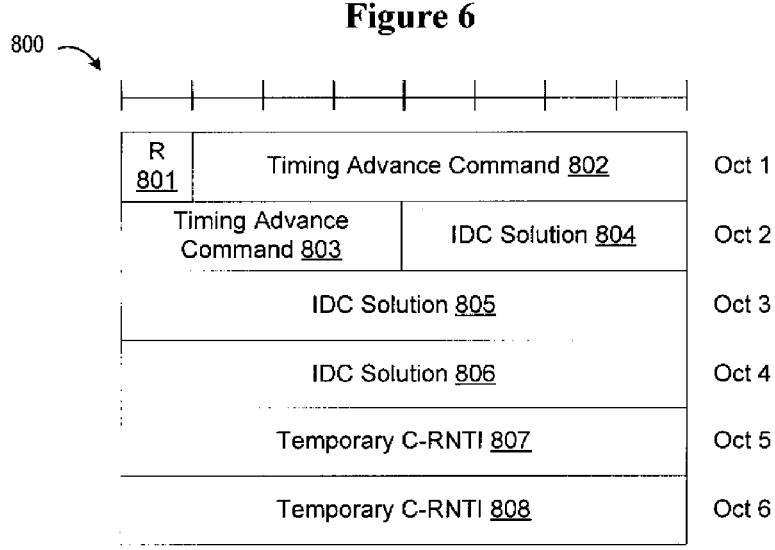
FIG. 7 illustrates the format of an IDC MAC random access response message sent in response to a dedicated access preamble providing an IDC indication.

As for conveying the details of the selected interference solution, the eNB may include the solution details in the IDC MAC RAR messages (e.g., 721-723) transmitted in the payload portion of the IDC MAC PDU (e.g., 701). As shown in FIG. 7, an IDC MAC RAR message 800 provides details of the selected interference solution by inserting IDC solution information into the payload fields. In the IDC MAC RAR 800, the following payload field descriptions apply:

The Reserved payload field (R) 801 is a reserved payload field which may be used as described below to indicate that the MAC RAR message is for IDC operation.

The Timing Adjustment payload field (TA) 802-803 is a command provided as an 11-bit index value (Index of T_A (0, 1, 2, . . . 1282)) to specify a timing adjustment that to be applied by the UE.

The IDC Solution payload field 804-806 is a 20-bit field used to indicate the IDC interference solution details.

The Temporary C-RNTI payload field 807-808 is a 16-bit temporary cell identifier that is used by the UE during Random Access.

In selected embodiments described herein, selected payload fields from the IDC MAC RAR message may be used to convey the IDC interference solution details. For example, the "R" bit payload field 801 can be us can be set to "1" to indicate that the MAC RAR 800 is used for IDC operation. In other embodiments, the "R" bit payload field 801 may be used as a solution flag where, for example, an "R" bit set to "1" indicates that the IDC solution includes an FDM solution, but an "R" bit set to "0" indicates a TDM solution. In similar fashion, the "R" solution flag bit 801 can be used to indicate a TDM-DRX or TDM-HARQ solution. For example, if the first "R" bit in the first E/T/R/R/BI MAC subheader (e.g., 710) is set to "1" and the second "R" bit in the first E/T/R/R/BI MAC subheader (e.g., 710) is set to "0" to indicate a TDM solution, then the "R" solution flag bit 801 can be set to "1" to indicate that the IDC solution includes TDM-DRX solution, and can be set to "0" to indicate that the IDC solution includes TDM-HARQ.

In other embodiments, the "IDC solution" payload field 804-806 may be used to indicate IDC solution by including a solution flag to indicate what solution is included in this field (e.g. FDM, TDM-DRX, TDM-HARQ). In selected embodiments, the solution flag is not used to indicate a specific solution when, for example, the MAC subheader or the "R" solution flag bit 801 in the IDC MAC RAR already provides this information. In this case, the solution flag bit can be added to other information field usage.

The "IDC solution" payload field 804-806 may also include "starting time" information to indicate when the solution starts. As will be appreciated, the "starting time" information can be defined as time or subframe information to indicate the start time.

The "IDC solution" payload field 804-806 may also optionally include "end time" information in either time or subframe format to indicate when the solution ends, or to indicate that there is no end time (e.g., "infinity" may be included as a value).

Finally, the "IDC solution" payload field 804-806 may include "specific solution" information to indicate a specific solution to be provided to the UE. For example, the "specific solution" field may indicate an FDM solution by specifying new frequency band or cell information, etc. The "specific solution" field may also indicate a TDM-DRX solution by specifying a scheduled and unscheduled period, etc. In addition, the "specific solution" field may indicate a TDM-HARQ solution by specifying an On/off time pattern, etc. Alternatively, the "specific solution" field may be a reserved field.

By now it should be appreciated that there is disclosed herein methods for accessing interference solutions using random access channels by user equipment (UE) having a first radio technology component (e.g., an LTE component) and a second radio technology component (e.g., a GNSS or ISM) on a single platform. In addition, computer program products are disclosed that include a non-transitory computer readable storage medium having computer readable program code embodied therein with instructions which may be adapted to be executed to implement a method for operating user equipment (UE) and/or a radio access network (eNB) in a coexistence mode, substantially as described hereinabove. In disclosed systems, methods, and computer program products, dedicated access preambles on a random access channel are allocated for quickly providing an IDC indication to the radio access network. Whether set as a system parameter or flexibly set with RRC signaling messages, the allocated IDC preambles for the random access channel are used to quickly signal the existence of IDC interference. In addition, random access response messages are provided for conveying interference solutions from the radio network once the user equipment detects and/or signals the existence of IDC interference. The RAR messages may be sent one or more times during an RAR window to provide for more robust exchange of IDC response messages, and may be formatted to include MAC subheader and payload information which conveys the interference solution from the radio access network.

Figure 8:
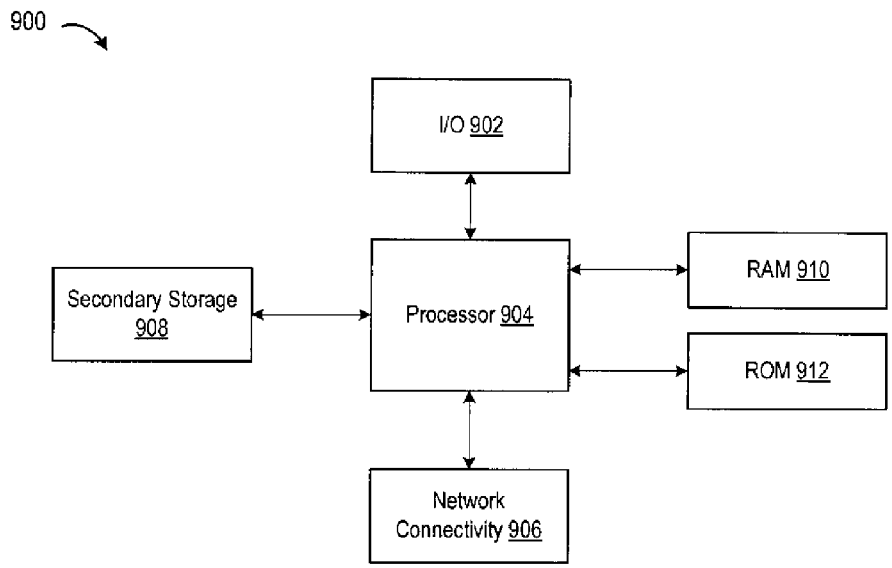
FIG. 8 illustrates an example computer system that may be suitable for implementing the in-device coexistence interference at a user device or network node.

The user devices and network elements described herein may include any general or special purpose computer with sufficient processing power, memory resources, and network throughput capability to handle the necessary workload placed upon it. FIG. 8 illustrates an example computer system 900 that may be suitable for implementing one or more embodiments disclosed herein. The computer system 900 includes a processor 904 (which may be referred to as a central processor unit or CPU) that is in communication with input/output (I/O) devices 902, network connectivity devices 906, an optional secondary storage 908, random access memory (RAM) 910, and read only memory (ROM) 912. The processor may be implemented as one or more CPU chips.

The secondary storage 908 is optionally included, and typically includes one or more disk drives or tape drives used for non-volatile storage of data and/or for over-flow data storage device if RAM 910 is not large enough to hold all working data. Secondary storage 908 may be used to store programs which are loaded into RAM 910 when such programs are selected for execution. The ROM 912 is used to store instructions and perhaps data which are read during program execution. ROM 912 is a non-volatile memory device which typically has a small memory capacity relative to the larger memory capacity of secondary storage. The RAM 910 is used to store volatile data and perhaps to store instructions. Access to both ROM 912 and RAM 910 is typically faster than to secondary storage 908.

I/O devices 902 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 906 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 906 devices may enable the processor 904 to communicate with an Internet or one or more intranets. With such a network connection, it is contemplated that the processor 904 might receive information from the network, or might output information to the network in the course of performing the above-described method steps. Such information, which is often represented as a sequence of instructions to be executed using processor 904, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 904 for example, may be received from and outputted to the network, for example, in the form of a computer data baseband signal or signal embodied in a carrier wave. The baseband signal or signal embodied in the carrier wave generated by the network connectivity 906 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 904 executes instructions, codes, computer programs, scripts which it accesses from hard disk, floppy disk, optical disk (these various disk-based systems may all be considered secondary storage 908), ROM 912, RAM 910, or the network connectivity devices 906. While only one processor 904 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 9:
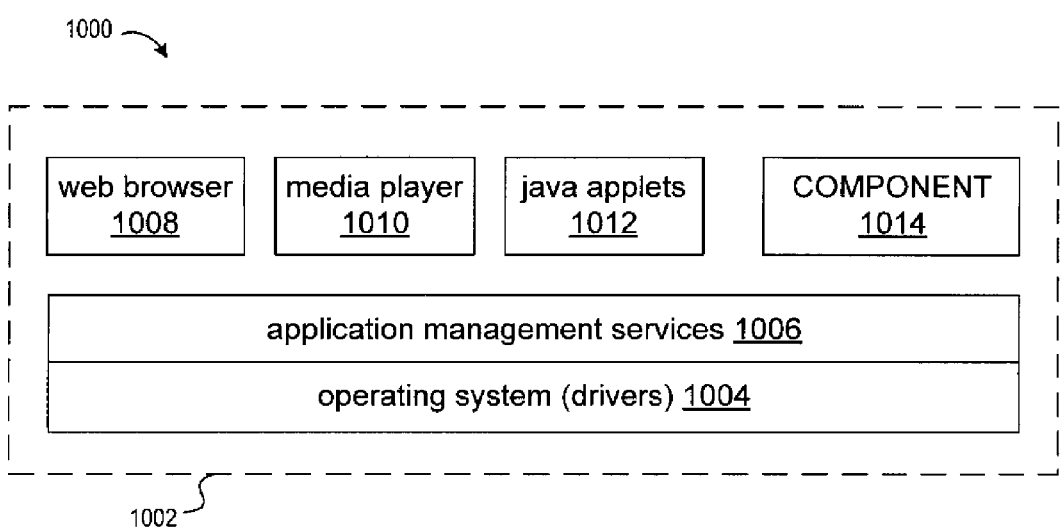
FIG. 9 is a diagram of a software environment that may be implemented on a user agent and/or network node operable for some of the various embodiments of the disclosure.

FIG. 9 is a diagram of a software environment 1000 that may be implemented on a communication device and/or network node operable for some of the various embodiments of the disclosure. As illustrated, one or more processing resources at the communication device or network node execute operating system drivers 1004 that provide a platform from which the rest of the software operates. The operating system drivers 1004 provide drivers for the device hardware with standardized interfaces that are accessible to application software. The operating system drivers 1004 include application management services ("AMS") 1006 that transfer control between applications running on the device. In UE instances, the software environment 1002 includes a web browser application 1008, a media player application 1010, and Java applets 1012 are provided as device applications. The web browser application 1008 configures the UE to operate as a web browser, allowing a user to enter information into forms and select links to retrieve and view web pages. The media player application 1010 configures the UE to retrieve and play audio or audiovisual media. The Java applets 1012 configure the UE to provide games, utilities, and other functionality. Finally, the component 1014 may provide the in-device coexistence interference management functionality described herein.

Figure 10:
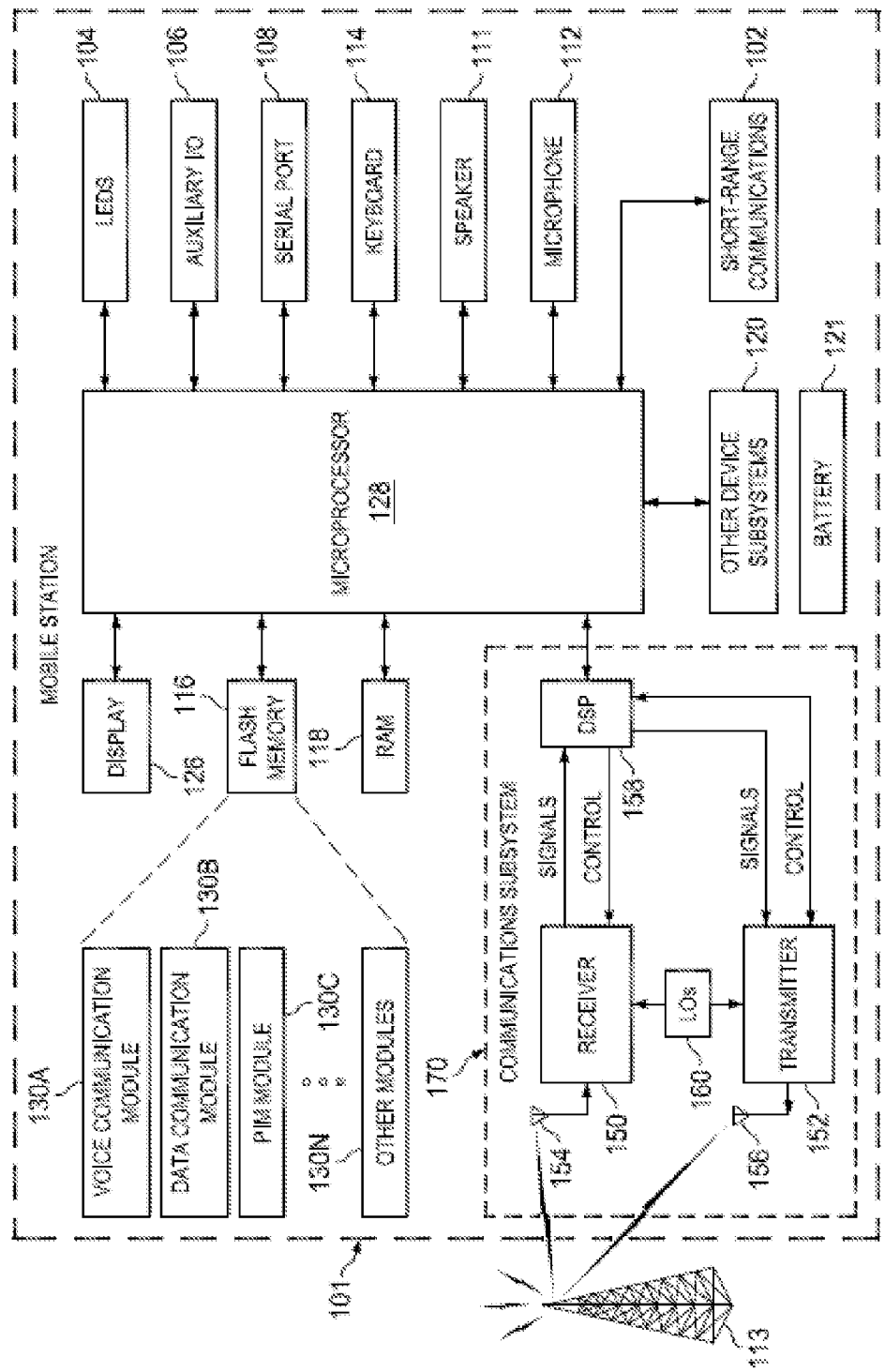
FIG. 10 is a schematic block diagram illustrating exemplary components of a mobile wireless communications device which may be used with selected embodiments.

Referring now to FIG. 10, there is shown a schematic block diagram illustrating exemplary components of a mobile wireless communications device 101 which may be used with selected embodiments. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATS. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1× EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein methods for use in user equipment (UE) devices comprising a first radio technology component (e.g., an LTE component) and a second radio technology component (e.g., a GNSS or ISM component) on a single platform. In disclosed systems and methodologies, the UE detects in-device coexistence interference at a radio component. At the radio component, the IDC interference can be detected by receiving an internal coordinated indication that a second radio component is or will be enabled, or by receiving an internal coordinated indication identifying a transmission frequency band being used by a second radio component, or by measuring in-device coexistence interference from a second radio component. The UE may then send an IDC interference indication message over a random access channel (RACH) to a radio access network. In selected embodiments, the IDC interference indication is sent by selecting a dedicated access preamble from one or more random access preambles for the random access channel that have been allocated by the radio access network to be used for providing an IDC indicator, and then sending the selected dedicated access preamble for the random access channel to provide the IDC indicator. In other embodiments, the UE may send a dedicated access IDC preamble for the random access channel that has been allocated by the radio access network. In still further embodiments, the IDC interference indication message may be sent by sending a dedicated access preamble for the random access channel to the radio access network, after which the UE receives a random access response message corresponding to the IDC interference indication message, and then sends an L2/L3 message to provide an IDC indicator to the radio access network. In any case, the UE may receive one or more preamble boundary parameters from the radio access network which specify one or more random access preambles for the random access channel that may be used as the dedicated access preamble. The preamble boundary parameters may be specified in a Radio Resource Control (RRC) message or MAC CE sent by the radio access network or as a system information block (SIB) broadcast by the radio access network, and may include a numberOf-IDC-Preamble parameter, a IDC-ConfigDedicated parameter, a numberOf-Dedicated-Preambles parameter, a Ra-IDCResponseWindowSize parameter, a Max-numberofIDCRAR parameter, a Ra-IDCPreambleIndex parameter, and/or a Ra-IDCPRACH-MaskIndex parameter. After sending the IDC interference indication message, the UE may receive a random access response message corresponding to the IDC interference indication message, where the random access response message comprises one or more control parameters for avoiding IDC interference at the UE.

In addition, there are disclosed methods for use in radio access network (eNB) to avoid interference between first and second radio components located on a single platform at a user equipment (UE). In the disclosed methodologies, the eNB may receive an interference indication message over a random access channel (RACH) which provides an indication of in-device coexistence (IDC) interference at a first radio component caused by a second radio component. In selected embodiments, the interference indication message is received as a dedicated access preamble for the random access channel. In other embodiments, the interference indication message is received as a dedicated access IDC preamble for the random access channel that has been allocated by the radio access network by sending one or more preamble boundary parameters to the UE which specify one or more random access preambles for the random access channel that may be used as the dedicated access preamble. In response to the interference indication message, the eNB may send a response message having one or more control parameters for avoiding IDC interference at the first radio component.

In another form there is disclosed computer program products implemented as a non-transitory computer readable storage medium having computer readable program code embodied therein that may be adapted to be executed to implement a method for operating user equipment (UE) in a coexistence mode. As disclosed, the computer program products may include instructions for detecting at the first radio component in-device coexistence interference from the second radio component, and then sending an IDC interference indication message over a random access channel (RACH) to a radio access network. In addition, the computer program products may include instructions for receiving a random access response message having one or more control parameters for avoiding IDC interference. The computer program products may also include instructions for enabling the first radio component with the one or more control parameters to use the second channel frequency without interference to/from the second radio component.

In yet another form, there is disclosed user equipment devices having a first radio technology component (e.g., an LTE component) and a second radio technology component (e.g., a GNSS or ISM component) on a shared platform. As disclosed, the UE may include processor control logic and/or circuitry configured to provide access over a random access channel to instructions for avoiding in-device coexistence interference from the second radio component by detecting at the first radio component in-device coexistence interference, and then sending a coexistence interference indication message to a radio access network over a random access channel. The processor control logic and/or circuitry then cause the UE to receive a response message with instructions for avoiding in-device coexistence interference at the first radio component.

In addition, also disclosed herein are embodiments of proposed changes to selected 3GPP TS reports and specifications that relate to the management and avoidance of in-device coexistence interference. For instance, with respect to TS 36.331, an example of the proposed changes is disclosed herein below:

---

RACH-ConfigIDC
The IE RACH-ConfigIDC is used to specify the generic random access parameters.
RACH-ConfigIDC information element

```
-- ASN1START
RACH-ConfigIDC ::=         SEQUENCE {
    preambleInfo                    SEQUENCE {
        numberOfIDC-Preambles           ENUMERATED {
                                            n4, n8, n12, n16, n20, n24, n28,
                                            n32, n36, n40, n44, n48, n52, n56,
                                            n60, n64},
        ...
    }  OPTIONAL                                                           -- Need OP
    },
    powerRampingParameters          SEQUENCE {
        powerRampingStep                ENUMERATED {dB0, dB2, dB4, dB6},
        preambleInitialReceivedTargetPower  ENUMERATED {
                                            dBm-120, dBm-118, dBm-116, dBm-114, dBm-112,
                                            dBm-110, dBm-108, dBm-106, dBm-104, dBm-102,
                                            dBm-100, dBm-98, dBm-96, dBm-94,
                                            dBm-92, dBm-90}
    },
    re-SupervisionInfo              SEQUENCE {
        preambleTransMax                ENUMERATED {
                                            n3, n4, n5, n6, n7, n8, n10, n20, n50,
                                            n100, n2001,
        ra-IDCResponseWindowSize        ENUMERATED {
                                            sf2, sf3, sf4, sf5, sf6, sf7,
                                            sf8, sf101,
}
-- ASN1STOP
```

RACH-ConfigCommon field descriptions numberOfIDC-Preambles
Number of dedicated random access preambles in TS 36.321. Value is an integer. Value n4 corresponds to 4, n8 corresponds to 8 and so on.
powerRampingStep
Power ramping factor in TS 36.321 [1]. Value in dB. Value dB0 corresponds to 0 dB, dB2 corresponds to 2 dB and so on.
preambleInitialReceivedTargetPower
Initial preamble power in TS 36.321 [1]. Value in dBm-120 corresponds to −120 dBm, dBm-118 corresponds to −118 dBm and so on.
preambleTransMax
Maximum number of preamble transmission in TS 36.321 [1]. Value is an integer. Value n3 corresponds to 2 3. n4 corresponds to 4 and so on.
re-IDCResponseWindowSize
Duration of the RA response window in TS 36.321 [1]. Value in subframes. Value sf2 corresponds to 2 subframes. sf3 corresponds to 3 subframes and so on.

RACH-ConfigIDCDedicated
The IE RACH-ConfigIDCDedicated is used to specify the dedicated IDC random access parameters.

RACH-ConfigIDCDedicated information element

```
-- ASN1START
RACH-ConfigIDCDedicated ::=    SEQUENCE {
    ra-IDCPreambleIndex            INTEGER (0..63),
    ra-IDCPRACH-MaskIndex          INTEGER (0..15)
}
-- ASN1STOP
```

RACH-ConfigDedicated field descriptions ra-IDCPreambleIndex
Explicitly signalled Random Access Preamble for RA Resource selection in TS 36.321 [1].
ra-IDCPRACH-MaskIndex
Explicitly signalled PRACH Mask Index for RA Resource selection in TS 36.321 [1].
[1] 3GPP TS36.321: Evolved Universal Terrestrial Radio Access (E-ULTRA); Medium Access Control (MAC) protocol specification.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to access procedures for in-device coexistence interference avoidance, the embodiments are not necessarily limited to the example embodiments which illustrate inventive aspects that are applicable to a wide variety of signaling schemes and applications. Thus, the particular embodiments disclosed above are illustrative only and should not be taken as limitations, as there may be modifications and practices in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope as defined by the appended claims so that those skilled in the art should understand that they can make various changes, substitutions and alterations without departing from the spirit and scope in its broadest form.

What is claimed is:

1. A method for use in a user equipment (UE), the method comprising:
   detecting, by the UE, at a radio component on the UE in-device coexistence (IDC) interference, wherein the in-device coexistence interference is caused by a second radio component on the UE; and
   sending, from the UE, an IDC interference indication message comprising a dedicated access preamble for a random access channel (RACH) to a radio access network, the dedicated access preamble providing an indication of IDC interference detected at the UE to the radio access network.

2. The method of claim 1 where the radio component comprises an LTE component and the second radio component comprises a Global Navigation Satellite System (GNSS) component or a component operating in an Industrial, Science and Medical (ISM) frequency band.

3. The method of claim 1, where sending the dedicated access preamble comprises sending a dedicated IDC access preamble for the random access channel that has been allocated by the radio access network to provide an IDC indicator of IDC interference at the UE.

4. The method of claim 3, further comprising selecting the dedicated IDC access preamble from one or more dedicated access preambles for the random access channel that have been allocated by the radio access network to be used by the UE to provide the IDC indicator.

5. The method of claim 3, further comprising receiving one or more preamble boundary parameters from the radio access network which specify one or more dedicated IDC access preambles that have been allocated by the radio access network to be used by the UE to provide the IDC indicator.

6. The method of claim 5, where the one or more preamble boundary parameters are specified in a Radio Resource Control (RRC) message or a Medium Access Control Control Element (MAC CE) message sent by the radio access network or as a system information block (SIB) broadcast by the radio access network.

7. The method of claim 5, where the one or more preamble boundary parameters comprise at least one of a numberOf-IDC-Preamble parameter, a IDC-ConfigDedicated parameter, a numberOf-Dedicated-Preambles parameter, a Ra-IDCResponseWindowSize parameter, a Max-numberofIDCRAR parameter, a Ra-IDCPreambleIndex parameter, and a Ra-IDCPRACH-MaskIndex parameter.

8. The method of claim 1, where sending the IDC interference indication message comprises:
   sending a dedicated access preamble for the random access channel in a first message to the radio access network and sending an IDC indicator in an L2 or L3 message to the radio access network to indicate IDC interference at the UE.

9. The method of claim 1, where sending the IDC interference indication message comprises:
   sending the dedicated access preamble for the random access channel to the radio access network;
   receiving a random access response message corresponding to the IDC interference indication message; and
   sending an L2/L3 message to further provide the IDC interference indication message to the radio access network.

10. The method of claim 1, further comprising:
    receiving a random access response message corresponding to the IDC interference indication message, where the random access response message comprises one or more control parameters for avoiding IDC interference at the UE.

11. The method of claim 1, where detecting IDC interference comprises receiving an internal coordinated indication that the second radio component is enabled.

12. The method of claim 1, where detecting IDC interference comprises receiving an internal coordinated indication identifying a transmission frequency band being used by the second radio component.

13. The method of claim 1, where detecting IDC interference comprises measuring at the radio component IDC interference from the second radio component.

14. A method for use in a radio access network to avoid interference between first and second radio components located on a single platform at a user equipment (UE), the method comprising:
    receiving an interference indication message from the UE over a random access channel (RACH), the interference indication message comprising a dedicated access preamble that provides an indication of in-device coexistence (IDC) interference detected by the UE at a first radio component caused by a second radio component, wherein the first radio component and the second radio component are both located on the UE; and
    sending the UE a response message comprising one or more control parameters for avoiding IDC interference at the first radio component.

15. The method of claim 14, wherein receiving the interference indication message comprises receiving the dedicated access preamble for the random access channel to signal detection of IDC interference at the UE.

16. The method of claim 15, wherein receiving the dedicated access preamble comprises receiving a dedicated IDC access preamble for the random access channel that has been allocated by the radio access network to signal detection of IDC interference at the UE.

17. The method of claim 16, further comprising sending one or more preamble boundary parameters to the UE which specify one or more dedicated access preambles for the random access channel that may be used as the dedicated IDC access preamble.

18. The method of claim 15, where receiving the dedicated access preamble comprises:
    receiving a dedicated access preamble for the random access channel in a first message from the UE; and
    receiving an IDC indicator in an L2 or L3 message from the UE to provide the indication of IDC interference at the UE.

19. A computer program product comprising a non-transitory computer readable storage medium having computer readable program code embodied therein, said computer readable program code adapted to be executed to implement a method for operating a user equipment (UE) in a coexistence mode, comprising:
    instructions for detecting, by the UE, at a radio component in-device coexistence (IDC) interference between a first radio component that uses a first channel frequency and a second radio component, wherein the first radio component and the second radio component are both located on the UE;
    instructions for sending, from the UE, an IDC interference indication message over a random access channel (RACH) to a radio access network, wherein the instructions for sending the IDC interference indication message comprise instructions for sending a dedicated access preamble for the random access channel to signal detection of IDC interference at the UE;

instructions for receiving a random access response message comprising one or more control parameters for avoiding IDC interference; and instructions for enabling the first radio component with the one or more control parameters to use a second channel frequency without interference to/from the second radio component.

20. The computer program product of claim 19, wherein the instructions for sending the dedicated access preamble comprise instructions for sending a dedicated IDC access preamble for the random access channel that has been allocated by the radio access network to signal detection of IDC interference at the UE.

21. The computer program product of claim 20, further comprising instructions for receiving one or more preamble boundary parameters from the radio access network which specify one or more dedicated access preambles for the random access channel that may be used as the dedicated IDC access preamble.

22. The computer program product of claim 19, wherein the instructions for sending the dedicated access preamble comprise:

instructions for sending the dedicated access preamble for the random access channel in a first message to the radio access network; and instructions for sending an IDC indicator in an L2 or L3 message to the radio access network to provide the indication of IDC interference at the UE.

23. A user equipment device, comprising:

a first radio component and a second radio component on a shared platform; and processor control logic and/or circuitry configured to provide access over a random access channel to instructions for avoiding in-device coexistence (IDC) interference from the second radio component by:

detecting at the first radio component in-device coexistence interference caused by the second radio component;

sending a coexistence interference indication message to a radio access network over a random access channel (RACH), wherein sending the coexistence interference indication message comprises sending a dedicated access preamble for the random access channel to signal detection of in-device coexistence interference at the user equipment device; and receiving a response message with instructions for avoiding in-device coexistence interference at the first radio component.

24. The user equipment device of claim 23, wherein sending the dedicated access preamble comprises sending a dedicated IDC access preamble for the random access channel that has been allocated by the radio access network to signal detection of IDC interference at the user equipment device.

25. The user equipment device of claim 24, where the processor control logic and/or circuitry is configured to receive one or more preamble boundary parameters from the radio access network which specify one or more dedicated access preambles for the random access channel that may be used as the dedicated IDC access preamble.

26. The user equipment device of claim 23, where sending the dedicated access preamble comprises:

sending the dedicated access preamble for the random access channel in a first message to the radio access network; and sending an IDC indicator in an L2 or L3 message to the radio access network to signal detection of IDC interference at the user equipment device.

\* \* \* \* \*